(12) United States Patent
Barth

(10) Patent No.: US 8,665,117 B2
(45) Date of Patent: Mar. 4, 2014

(54) METHOD AND APPARATUS FOR SUPPORTING A PARKING PROCESS OF A VEHICLE

(75) Inventor: Harald Barth, Korntal-Munchingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 240 days.

(21) Appl. No.: 13/060,360

(22) PCT Filed: Aug. 26, 2009

(86) PCT No.: PCT/EP2009/006169
§ 371 (c)(1),
(2), (4) Date: Feb. 23, 2011

(87) PCT Pub. No.: WO2010/025865
PCT Pub. Date: Mar. 11, 2010

(65) Prior Publication Data
US 2011/0148663 A1   Jun. 23, 2011

(30) Foreign Application Priority Data
Sep. 2, 2008   (DE) .......................... 10 2008 045 377

(51) Int. Cl.
*B60Q 1/48*   (2006.01)
(52) U.S. Cl.
USPC ............... 340/932.2; 342/27; 342/59; 342/70
(58) Field of Classification Search
USPC .............................. 340/932.2; 342/27, 59, 70
See application file for complete search history.

(56) References Cited

U.S. PATENT DOCUMENTS

2007/0075875 A1 *   4/2007   Danz et al. ................. 340/932.2

FOREIGN PATENT DOCUMENTS

| DE | 10 2005 015396 A1 | 12/2005 |
| DE | 10 2006 030560 A1 | 1/2008 |
| EP | 1 602 530 A1 | 12/2005 |
| EP | 1 747 973 A1 | 1/2007 |

OTHER PUBLICATIONS

International Search Report w/translation from PCT/EP2009/006169 dated Dec. 11, 2009 (6 pages).

* cited by examiner

*Primary Examiner* — Daryl Pope
(74) *Attorney, Agent, or Firm* — Osha Liang LLP

(57) ABSTRACT

The invention relates to a method and a device for assisting a parking process of a vehicle (1) into a longitudinal parking space (P) which is arranged next to a carriageway (F) having a measuring device for measuring the parking space (P) while said vehicle (1) travels past, and for determining the position of a front boundary (A2) and/or of a rear boundary (A1) of the longitudinal parking space (P), and having an evaluation device for determining, on the basis of the position (O1, O2) of the front boundary (A2) and/or of the rear boundary (A1), a parked position (G2) of the vehicle (1) in the longitudinal parking space (P), and of determining a parking travel (E). So that the parked position (G) of the vehicle (1) can be defined by the evaluation unit in a particularly reliable way, the profile of the travel (V) of the vehicle (1) is measured by the measuring device as said vehicle (1) passes the longitudinal parking space (P), and is additionally taken into account in the definition of the parked position (G) of the vehicle (1) by the evaluation device.

12 Claims, 1 Drawing Sheet

METHOD AND APPARATUS FOR SUPPORTING A PARKING PROCESS OF A VEHICLE

Figure 1:
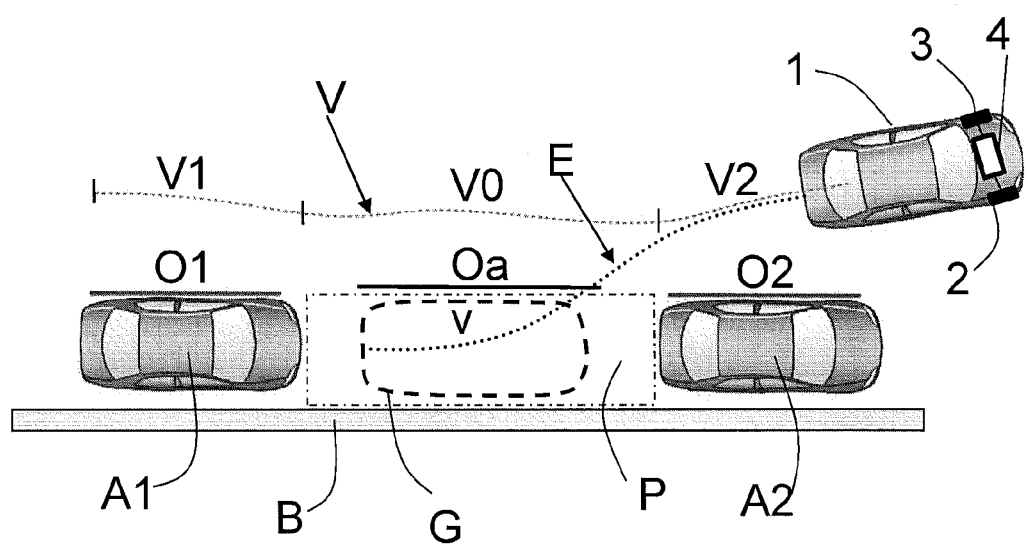

The invention relates to a method and to a device for assisting a parking process of a vehicle into a longitudinal parking space which is arranged next to a carriageway, of the type mentioned in the preamble of Claims 1 and 9, respectively.

EP 1 602 530 B1 has already disclosed a method for assisting a parking process of a vehicle into a longitudinal parking space which is arranged next to a carriageway, in which method the vehicle to be parked firstly travels past the longitudinal parking space and measures said parking space by means of a measuring device. The measuring device comprises here at least one distance sensor which is arranged laterally on the vehicle and by means of which the length and depth of the longitudinal parking space are determined as the vehicle passes said parking space. Furthermore, during the travel past, distance measurements are performed by the measuring device immediately before and after the vehicle passes by the longitudinal parking space, in order to determine the position of a front boundary and of a rear boundary of the longitudinal parking space, such as for example a parked car. These measurement data are transferred to an evaluation device, which then defines the parked position of the vehicle in the longitudinal parking space on the basis of the position of the front boundary and of the rear boundary.

In this context, the orientation of the front boundary and that of the rear boundary are respectively determined, for example, by the measuring device, and the parked position is defined by the evaluation device in such a way that the orientation of the vehicle in the parked position corresponds to the average value of the orientations of the front boundary and of the rear boundary. Alternatively it is proposed to determine the positions of the front boundary and of the rear boundary by means of the measuring device, and to orient the vehicle in the parked position G parallel to a connecting line between the front boundary and the rear boundary.

The known method supplies good results for the parked position if the front and rear boundaries are oriented approximately parallel to the longitudinal parking space. In practice, it may, however, be found that one of the boundaries is formed by a parked vehicle which is arranged obliquely or at a large lateral distance from the longitudinal parking space. This leads to a situation in which the vehicle to be parked is also arranged obliquely in its parked position on the parking space, and can project into a traffic space which is arranged laterally next to the parking space.

The object of the invention is to develop a method and a device for assisting a parking process of a vehicle of the type mentioned in the preamble of Claim 1 and of Claim 9, to the effect that the parked position of the vehicle can be defined by the evaluation unit in a particularly reliable fashion.

This object is achieved according to the invention by a method according to Claim 1 and a device according to Claim 9. Further features which advantageously configure the invention are contained in the subclaims.

The advantage achieved with the invention is that during the definition of the parked position, the evaluation device takes into account not only the position of the front boundary and of the rear boundary of the longitudinal parking space but also the profile of a travel of the vehicle as said vehicle passes the longitudinal parking space. The profile of the travel as the vehicle passes the longitudinal parking space provides a starting point for the profile of the carriageway running along next to the parking space, and can therefore be used to perform plausibility checking of the positions of the front boundary and/or of the rear boundary. If no optimum orientation of the parked position can be expected on the basis of the positions of the front boundary and/or of the rear boundary, the profile of the travel itself can be used as a reference for the orientation of the parked position. In this context, the driver has the possibility of easily influencing the parked position by correspondingly controlling the vehicle as the vehicle travels past the longitudinal parking space.

The evaluation device preferably compares the positions of the front boundary and the rear boundary of the longitudinal parking space with one another, and defines the parked position on the basis of the travel if the positions of the two boundaries have more than a predefined maximum deviation from one another. As a result, it can be ensured that the parked position is defined particularly reliably if the front boundary or rear boundary is arranged obliquely or at a large lateral distance from the longitudinal parking space. The parked position can be defined here in a particularly easy and reliable way such that the orientation of the vehicle in the parked position corresponds to an averaged orientation of the travel. In order to improve the definition of the parked position on the basis of the travel even further, it is possible to take into account in the determination of the averaged orientation only the longitudinal sections of the travel which undershoot a predefined maximum curvature or maximum tolerance range.

In contrast, the evaluation device preferably defines the parked position on the basis of the position of the front and rear boundaries if the latter have no more than the predefined maximum deviation from one another. When the maximum deviation is undershot, better positioning is to be expected on the basis of the position of the front and rear boundaries than on the basis of the travel profile. In this context, the evaluation device can particularly easily and reliably compare the orientations of the front boundary and of the rear boundary with one another and, if these do not exceed a predefined maximum angle, can define the parked position in such a way that the orientation of the vehicle corresponds to the average value of the orientations of the front obstacle and of the rear obstacle.

The profile of the travel can be particularly easily and cost-effectively measured by means of at least one travel sensor and one steering angle sensor of the measuring device.

The evaluation device preferably respectively determines the longitudinal extent of the front boundary and/or of the rear boundary of the longitudinal parking space and defines the parked position on the basis of the travel if the longitudinal extent, i.e. the extent thereof in the longitudinal direction of the carriageway, of the front boundary and/or rear boundary of the longitudinal parking space is shorter than a predefined minimum length, or these boundaries have been detected by the measuring device only over a length which is shorter than the predefined minimum length. This ensures that the parked position is oriented on the basis of the boundaries only when there are sufficiently long boundaries, since as a rule only such boundaries permit a sufficient starting point for the orientation of the parked position. Furthermore, the evaluation device can also define the parked position on the basis of the travel whenever the measurement data for the front boundary and/or the rear boundary of the longitudinal parking space have an excessively low data quality. The data quality is to be understood here as meaning in particular the variation of successive individual measurements.

An exemplary embodiment of the invention will be explained in more detail below on the basis of a graphic illustration.

Figure 2:
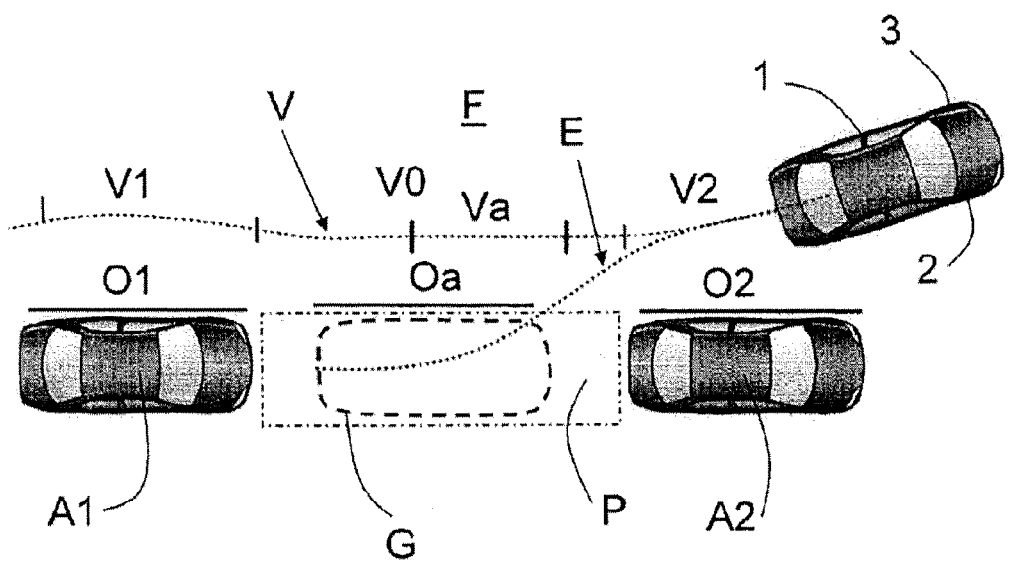

In the illustration, in each case in a schematic plan view:

FIG. 1 shows a parking process of a car into a longitudinal parking space which is arranged next to a carriageway, and FIG. 2 shows a parking process of the car into a longitudinal parking space with an alternative definition of the parked position.

FIGS. 1 and 2 show a schematic plan view of parking processes of a car 1 into a longitudinal parking space P which is arranged next to a carriageway F. The longitudinal parking space P is bound by a front obstacle and a rear obstacle, which are respectively formed by a parked vehicle A1 and a parked vehicle A2. The lateral boundaries of the longitudinal parking space P are formed by the carriageway F and by an obstacle in the form of a kerbstone B running at a lateral distance from the carriageway.

The car 1 has a device for assisting a parking process, which comprises a measuring device and an evaluation device 4. The measuring device has two lateral distance sensors 2 and 3, which are each arranged near to the front of the vehicle on the driver's side or front seat passenger's side of the car 1. The distance sensors 2 and 3 are embodied as ultrasonic distance sensors, which are known per se, and are each arranged on a lateral edge of a front bumper of the car 1. Alternatively, the distance sensors 2 and 3 can, however, also be arranged near to the rear of the vehicle, for example on a rear bumper.

The distance sensors 2 and 3 are connected to a control device (not shown) and are designed to detect objects which are arranged laterally next to the car 1, and to determine the lateral distance of said objects from the car 1. The control device actuates the distance sensors 2 and 3 in such a way that as the car 1 passes the longitudinal parking space P along the carriageway F, at least the longitudinal extent of the longitudinal parking space P and the position and orientation of the vehicles A1 and A2 parked in front of and behind the longitudinal parking space P is measured. However, it is also possible to determine still further geometric data, such as the depth of the longitudinal parking space P or the profile and orientation of the kerbstone B, by means of measurement. The longitudinal extent and the geometric data which, if appropriate, are additionally determined, can be transmitted to an evaluation unit which is preferably embodied so as to be integral with the control device, and comprises storage means for storing said data.

The measuring device of the car 1 also comprises a travel sensor (not shown) for determining travel of the car 1, where the travel sensor is embodied as a wheel sensor which is known per se and which measures the revolutions of a vehicle wheel. On the basis of the wheel circumference, the measuring device is then able to determine the travel carried out by the car in the longitudinal direction. In order to determine the travel transversely with respect to the longitudinal direction, the measuring device also comprises a steering angle sensor (not shown) by means of which the steering angle which is set by the driver is continuously measured as the car 1 travels past the longitudinal parking space P. The time profile of the steering angle is transmitted from the measuring device to the evaluation unit which continuously determines the position of the car 1 on the basis of the data of the steering angle sensor and the travel sensor, and stores the profile of the travel V of the car 1 by means of a storage means as said car 1 travels past the longitudinal parking space P.

The profile of the travel V constitutes here a two-dimensional curve which runs in the plane of the carriageway F. The evaluation unit is designed to define an averaged orientation of the travel V on the basis of the profile of the travel V. The averaged orientation of the travel V corresponds here to an averaged tangent which is determined from individual tangents of the travel V. In this context, the evaluation unit can comprise means for smoothing the profile of the travel V in a suitable way before the averaged orientation is determined.

The evaluation unit also comprises, in addition to the storage means, a processor with a programme code in order to define a parked position G of the car 1 within the parking space P on the basis of the data transferred by the measuring device, and to subsequently determine, on the basis of a starting position of the car 1, a parking path B along which the car 1 is driven into its parked position G.

The evaluation unit is connected here via a bus system to a steering system (not shown) of the car 1 in order to actuate the steering system during the parking of the car 1 in such a way that the car 1 is moved from its starting position along the parking path B into its parked position G. The longitudinal control of the car 1, i.e. acceleration and braking, is performed here by the driver himself. However, the evaluation unit could alternatively also be connected via the data bus system to an engine controller and brake of the car 1 in order to permit a fully autonomous parking process.

The evaluation unit is also designed to output to the driver information relating to the parking process via an output device, such as for example a display and/or sound generator arranged the car interior. In this context, it is possible to convey to the driver, for example, instructions relating to the longitudinal control of the car 1 and also relating to the actuation of the starting position for the parking process. Furthermore, instructions relating to the steering of the car 1 can also be given to the driver. It is possible here to convey to the driver instructions relating to the manual setting of specific steering angles, with the result that the parking process is performed manually by the driver on the basis of the control instruction of the output device 4. It is possible to dispense here with actuation of the steering system by the evaluation device.

The parking process of the car 1 into the longitudinal parking space P occurs as follows:

First, the longitudinal parking space P is measured while the vehicle travels past. The data are then transmitted from the measuring device to the evaluation unit which then defines a starting position for the parking process, the parked position G of the car 1 within the longitudinal parking space P and a parking path E.

In order to measure the longitudinal parking space P, the car 1 is driven by the driver from a starting position along the carriageway F and laterally past the longitudinal parking space P, wherein the car 1 follows the travel V which is defined by the driver by means of the steering system. This travel V is to be measured—starting from a reference point defined at the start of the measurement—continuously by means of a travel sensor and a steering angle sensor, and is stored by the evaluation device 4.

The travel V comprises here a first travel section V1, which runs in the lateral region of overlap with the vehicle A1 parked behind the longitudinal parking space P. During the journey along this travel section V1, the lateral distance between the vehicle 1 to be parked and the parked vehicle A1 is measured continuously by means of the distance sensor 2 arranged on the front seat passenger's side. On the basis of the distance data measured at various times and the profile of the travel section V1, the evaluation device 4 subsequently determines the position and orientation O1 of the vehicle A1 parked behind the longitudinal parking space. Orientation is meant here as the angular position of the broad side of the parked vehicle A1 facing the carriageway with respect to a reference axis defined at the start of the measurement.

The travel section V1 is adjoined by a travel section V0 in which the car 1 to be parked moves in the lateral region of overlap with the longitudinal parking space P. The junction between the two travel sections is detected here in a known fashion by means of a change in the distance data measured by the distance sensor 2. During the journey along the travel section V0, the lateral distance between the car 1 and the kerbstone B laterally bounding the longitudinal parking space P is continuously measured by the distance sensor 2. On the basis of this distance data and the profile of the travel section V0, the evaluation device 4 subsequently determines the position and orientation of a kerbstone B or of some other lateral boundary of the longitudinal parking space P which faces away from the carriageway, insofar as such a boundary is present.

The travel section V0 is adjoined by a travel section V2 in which the car 1 travels in the lateral region of overlap with the vehicle A2 which is parked in front of the longitudinal parking space. During the journey along the travel section V2, the position and orientation O2 of the vehicle A2 which is parked in front of the longitudinal parking space P is determined from the distance measurements of the distance sensor 2 by the evaluation device 4 in the way already described for the travel section V1.

The evaluation device 4 subsequently determines a parked position G of the car 1 from the measurement data acquired while the vehicle travels past the longitudinal parking space P, on the basis of the following sequence:

At first, the position and orientation O1 and O2, respectively, of the vehicles A1 and A2 parked in front of and behind the longitudinal parking space P are compared with one another by the evaluation unit. If the positions of the two vehicles A1 and A2 are at a lateral distance from one another, i.e. a distance in the transverse direction with respect to the carriageway B which is smaller than or equal to a predefined maximum distance stored in the evaluation unit, and also the orientations O1 and O2 of the rear parked vehicle A1 and of the front parked vehicle A2 deviate from one another by no more than a predefined maximum angle which is also stored in the evaluation unit, the orientation of the parked position is defined as an average value of the orientations O1 and O2. That is to say in the parked position G the centre longitudinal axis of the car 1 has, with respect to the reference axis defined at the beginning, an angle which corresponds to the average value of the angles of the parked vehicles A1 and A2 with respect to the reference axis.

Alternatively, the orientation Ov of the parked position G parallel to a connecting axis of the two parked vehicles A1 and A2 can be defined. In this case, it is sufficient that the evaluation unit merely determines the position of the end regions, adjoining the longitudinal parking space P, of the front parked vehicle A2 and of the rear parked vehicle A1, and orients the orientation Og of the parked position G parallel to the connecting axis of these end regions insofar as the lateral distance therefrom does not exceed a predefined maximum value.

If the lateral distance between the parked vehicles A1 and A2 is larger than the predefined maximum distance and/or if the two orientations O1 and O2 differ from one another by more than the predefined maximum angle, the orientation of the parked position is defined on the basis of the profile of the travel V. In FIG. 1 it is apparent that the evaluation unit determines here, from the stored profile of the travel V, an average orientation which corresponds to an averaged tangent of the travel V. The parked position G of the car 1 is then defined in such a way that the central longitudinal axis of the car 1 runs parallel to the averaged orientation of the travel V.

In relation to FIG. 2, it is apparent that, alternatively, when determining the averaged orientation of the travel V the evaluation unit uses only longitudinal sections Va of the travel V which do not exceed a predefined maximum curvature stored in the evaluation unit. In FIG. 2, this is shown by way of example for a travel V with a single sufficiently straight section Va. In addition, it is, however, also possible for the evaluation unit to use a plurality of sufficiently straight longitudinal sections of the travel V. In such a case, the evaluation unit can separately determine an average orientation for each of the sufficiently straight longitudinal sections, and respectively compare said orientations with one another. In order to determine the overall average orientation of the travel V, only the separately averaged orientations of the individual longitudinal sections which differ from one another by less than a predefined maximum deviation are then used.

In order to reduce the influences of measuring errors on the parked position G when measuring distances, the evaluation unit can also take into account in the determination of the averaged travel orientation only those longitudinal sections of the travel V in which a predefined maximum tolerance range is not exceeded in the chronologically successive distance measurements.

If the longitudinal parking space P is, as in FIG. 1, bounded by a kerbstone B on the side facing away from the carriageway F, the profile of the kerbstone B can be additionally used to determine the parked position G of the car 1. In this context, the evaluation unit determines an averaged profile of the kerbstone B, in which case only the longitudinal sections of the kerbstone B in which a predefined maximum curvature or measurement data tolerance range is not exceeded are also used here.

The parked position G of the car 1 is defined in accordance with the following method:

If, as the vehicle travels past the evaluation device 4, a kerbstone B is detected and the variation of the associated measurement data does not exceed a predefined threshold, the orientation of the parked position G is defined on the basis of the profile of the kerbstone B. During the decision as to whether the measurement data of the kerbstone B are used, it is possible for the evaluation unit to additionally check whether the kerbstone B has been detected over a sufficient longitudinal section of the longitudinal parking space P and whether the detected kerbstone B has a straight profile over a sufficient longitudinal region. If the evaluation unit has not detected a kerbstone B or a kerbstone has been detected but one of the abovementioned quality criteria has been infringed, the orientation of the parked position G is determined in accordance with the previously described method on the basis of the position and orientation of the parked vehicles A1 and A2 or of the profile of the travel V.

The lateral position of the parked position G within the longitudinal parking space P is determined by the evaluation unit on the basis of the measured positions of the parked vehicles A1 and A2 or on the basis of the position of the kerbstone B or of some other lateral boundary of the longitudinal parking space P. In this context, the evaluation device 4 preferably defines the parked position G in such a way that the car 1 is at a predefined lateral distance from the kerbstone B which is stored in the evaluation device 4. If no kerbstone B is present or if such a kerbstone B could not be measured with sufficient quality, the lateral position of the parked position G is defined on the basis of the lateral positions of the parked vehicles A1 and A2. In this context, the parked position G is preferably defined in such a way that the car 1 is at a predefined lateral distance from one of the parked vehicles A1 or A2 or from a connecting axis of these vehicles which is stored in the evaluation device 4.

After the parked position G has been defined, the evaluation device 4 calculates, on the basis of the starting position of the car 1, a parking path E, and indicates to the driver via the output device that controlled parking is possible. For the purpose of parking, the car 1 is then temporarily stopped in a starting position by the driver after the car 1 has passed by the parking space P. After the car 1 has stopped in the starting position, the driver initiates the parking process by engaging a reverse gear speed. During the parking, the driver controls the velocity of the car 1 by acceleration interventions and braking interventions, while the evaluation device 4 automatically activates the steering system in accordance with the parking path E via the bus system of the car 1. The car 1 then travels in reverse from the starting position along the parking path E into its parked position G.

The invention claimed is:

1. A method for assisting a parking process of a vehicle into a longitudinal parking space which is arranged next to a carriageway, comprising:
    measuring the longitudinal parking space as the vehicle travels past the longitudinal parking space using a measuring device, wherein the measuring device determines a position of a front boundary and/or of a rear boundary of the longitudinal parking space;
    defining a parked position of the vehicle within the longitudinal parking space using an evaluation device on the basis of the position of the front boundary and/or rear boundary; and
    determining a parking path of the vehicle into the parked position using the evaluation device,
    wherein a profile of travel of the vehicle is measured by the measuring device as said vehicle passes the longitudinal parking space and is additionally taken into account in the definition of the parked position of the vehicle by the evaluation device,
    wherein the parked position is defined by the evaluation device so that the orientation of the vehicle in the parked position corresponds to an averaged orientation of the travel.

2. The method according to claim 1, wherein the evaluation device compares orientations of the front boundary and the rear boundary of the longitudinal parking space with one another, and defines the parked position on the basis of the travel when the orientations of the front boundary and of the rear boundary differ from one another by more than a predefined maximum deviation.

3. The method according to claim 2, wherein the parked position is defined by the evaluation device on the basis of the orientations of the front boundary and the rear boundary when the latter deviate from one another by less than the predefined maximum deviation.

4. The method according to claim 3, wherein the parked position is defined by the evaluation device in such a way so that an orientation of the vehicle corresponds to the average value of the orientations of the front boundary and of the rear boundary when the orientations of the front and rear boundaries do not deviate from one another by more than a predefined maximum angle.

5. The method according to claim 1, wherein, during the determination of the averaged orientation of the travel, only the longitudinal sections of the travel which do not exceed a predefined maximum curvature are taken into account.

6. The method according to claim 1, wherein the travel of the vehicle is measured by at least one travel sensor and a steering angle sensor of the measuring device.

7. The method according to claim 1, wherein the evaluation device determines a longitudinal extent of the front boundary and/or of the rear boundary of the longitudinal parking space, and defines the parked position on the basis of the travel when the longitudinal extent of the front boundary and/or of the rear boundary of the longitudinal parking space are shorter than a predefined minimum length.

8. A device for assisting a parking process of a vehicle into a longitudinal parking space which is arranged next to a carriageway, comprising:
    a measuring device for measuring the longitudinal parking space as the vehicle travels past the longitudinal parking space, and for determining a position of a front boundary and of a rear boundary of the longitudinal parking space; and
    an evaluation device for:
        defining a parked position of the vehicle within the longitudinal parking space, and
        determining a parking path of the vehicle into the parked position on the basis of the position of the front boundary and/or of the rear boundary,
    wherein the measuring device comprises means for measuring a profile of travel of the vehicle while said vehicle passes the longitudinal parking space, and the evaluation device takes into account the measured travel in the definition of the parked position of the vehicle,
    wherein the parked position is defined by the evaluation device so that the orientation of the vehicle in the parked position corresponds to an averaged orientation of the travel.

9. The device according to claim 8, wherein the evaluation device compares with one another orientations of the front boundary and of the rear boundary of the longitudinal parking space and defines the parked position on the basis of the profile of the travel, when the orientations of the front boundary and of the rear boundary differ from one another by more than a predefined maximum deviation.

10. The device according to claim 9, wherein the evaluation device defines the parked position on the basis of the orientations of the front boundary and of the rear boundary when the latter differ from one another by less than the predefined maximum deviation.

11. The device according to claim 10, wherein the evaluation device determines an average value of the orientations of the front boundary and of the rear boundary and to define the parked position so that an orientation of the vehicle corresponds to the average value of the orientations of the front boundary and of the rear boundary when the two orientations do not deviate from one another by more than a predefined maximum angle.

12. The device according to claim 8, wherein, the means for measuring the travel comprise at least one travel sensor and one steering angle sensor.

* * * * *